United States Patent [19]

Salyer et al.

[11] Patent Number: 4,783,710
[45] Date of Patent: Nov. 8, 1988

[54] FLEXURE MOUNT FOR A DISC DRIVE ACTUATOR

[75] Inventors: Steven R. Salyer, Santa Cruz; Jonathan F. Toor; Matthew J. Giluso, both of Santa Clara County, all of Calif.

[73] Assignee: Seagate Technology, Inc., Scotts Valley, Calif.

[21] Appl. No.: 915,687

[22] Filed: Oct. 2, 1986

[51] Int. Cl.4 .............................................. G11B 5/48
[52] U.S. Cl. .................................... 360/104; 360/107; 360/109
[58] Field of Search ......................... 360/97, 104–106, 360/98, 99, 100–103, 107, 109

[56] References Cited

U.S. PATENT DOCUMENTS 4,544,973 10/1985 Van de Bult .......................... 360/97

Primary Examiner—John H. Wolff
Attorney, Agent, or Firm—Flehr, Hohbach, Test, Albritton & Herbert

[57] ABSTRACT

A disc drive is disclosed having a carriage arm comprising a magnesium head mount and stainless steel flexure. The two pieces are joined where they overlap by a single rivet pressed into a hole at the center line or main axis of the head mount and flexure. The magnesium is thereby free to float on either side of the rivet, thus alleviating stress and the resulting motion of the flexure.

5 Claims, 2 Drawing Sheets

FIG.—1

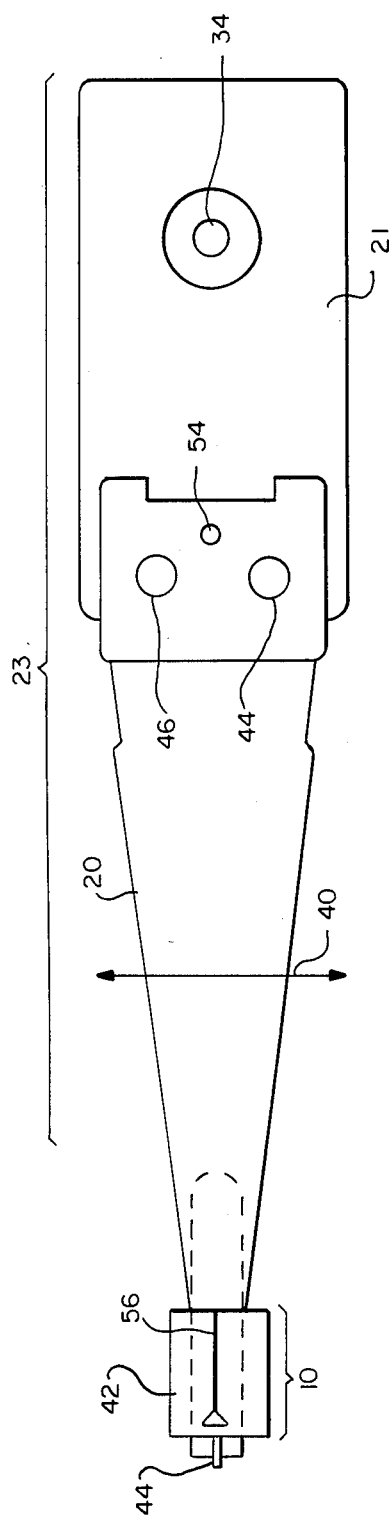
FIG.-2
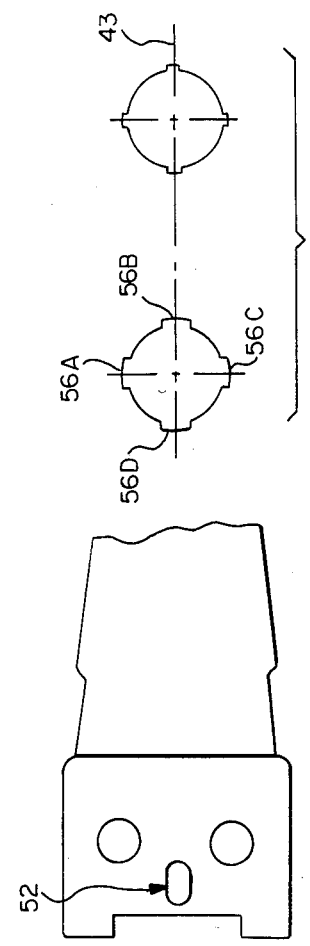
FIG.-3C
FIG.-3B
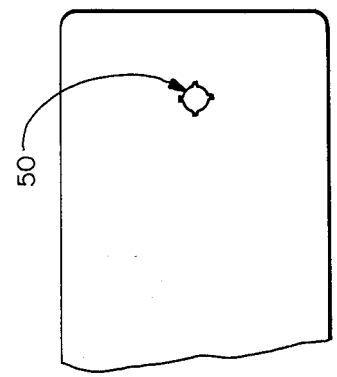
FIG.-3A

FLEXURE MOUNT FOR A DISC DRIVE ACTUATOR

The invention is directed generally to the field of disc drives incorporating rotary actuators, and more particularly to a mounting for a flexure for a disc drive which is especially useful with a low mass arm which is directly aligned with the head transducer gap.

Disc drive machines record and reproduce information stored on concentric circular tracks on magnetic discs. Tracks are written and read by magnetic heads which must be accurately positioned over one of the tracks on the surface of the disc. Various methods have been used to position the heads. The two common types of head positioning mechanisms are linear and rotary head carriages.

Rotary actuators, in which the arm which carries the flexure, slider and transducer rotates about a pivot point, have long been used in the disc drive art to position the head over the track. However, it has been believed to be a requirement of such systems that the arm be positioned to the side of the disc drive media with a support structure for the head being cantilevered out at a 90 angle from the moving drive arm over the disc. The transducer head itself must then be mounted perpendicular to this cantilevered arm in order that the transducer head gap be properly aligned with the selected concentric track. Such an arm design typically has a significant amount of mass and inertia. This makes it very difficult to quickly move the head from track to track.

It is therefore an object of the present invention to provide a rotary head actuator in which the mass of the head supporting arm is minimized.

A second objective in the design of any such rotary actuator is to provide as much arm stiffness as possible so that the head can be accurately moved from track to track with minimal displacement from a center position due to any flexibility in the positioning arm. However, usually the price to paid for additional arm stiffness is additional mass, leading to an increase in inertia. It is therefore an objective of the present invention to provide an improved rotary head carriage arm which maintains arm stiffness without undue increases in inertia.

A third problem to be addressed in the design of any rotary actuator is maintenance of alignment of the transducer gap and the slider which carries the transducer tangent to the track being read. Obviously, the relative included angle between the tangent at the point on the track to be read and the main axis of the transducer will vary as the head moves from the inner-most to the outermost track. This problem has typically been addressed through complex structural design of the head carrying arm of the rotary actuator.

An objective of this invention is to provide a simple arm structure in which the relative included angle between the main axis of the transducer gap and slider and the tangent to the track being accessed is kept to a minimum.

A fourth problem with conventionally designed rotary actuators is their tendency to introduce off-track errors due to expansion and contraction of components over the operating temperature range. Therefore, a further objective of the present invention is to provide a configuration of components such that expansion or contraction over the operating temperature range will be in a direction least likely to cause off-track positioning errors.

Yet another problem with such rotary disc drives of the type shown in FIG. 1 of this application is that they are very sensitive to mistracking caused by sideways movement of the elements of the head support arm.

It is an objective of this invention to stabilize the head support arm against sideways movement.

Yet another objective of disc drive design is to reduce the overall height or profile of the disc drive, to maximize storage capacity in a limited space. One of the key factors in determining necessary drive height is the size of the head carrying arm. Therefore, an objective of the present invention is to provide a transducer carrying arm of reduced height or thickness.

SUMMARY OF THE INVENTION

The inventors of this invention have discovered that the carriage arm, which consists of two parts connected end to end, can be a source of uncompensated deflection of the read/write head away from its targeted position.

The two parts of the head arm are a magnesium head mount and stainless steel flexure. The inventors herein realized that this created a bimetallic strip having differential motion over the operating temperature range of the drive.

The motion cannot be eliminated; however, it can be taken into account and compensation provided in a manner disclosed herein.

The objectives of this invention are achieved by providing a transducer carrying a slider in which the main slider is aligned with the main axis of the carriage arm. The carriage arm itself comprises a magnesium head mount and stainless steel flexure. The two pieces are joined where they overlap by a single rivet pressed into a hole at the center line or main axis of the head mount and flexure. The magnesium is thereby free to float on either side of the rivet, thus alleviating stress and the resulting motion of the flexure.

A potential difficulty with using a single rivet is that there is no mechanism to keep the rivet and flexure from rotating about the rivet's axis of rotation. This was overcome by providing a featured hole in one of the head mount and flexure. The features comprise extensions of the hole along the main axis of the arm and an axis perpendicular thereto.

In assembling the carriage arm, a rivet is inserted through the holes in the head mount and flexure. Sufficient pressure is applied to cause the rivet to cold flow into the featured hole in the arm and the oval hole in the flexure, inhibiting rotation of the parts.

Except for changes in wiring connections, the same carriage arm combination of flexure and head mount may be used above and below the disc. Design of the carriage arm is clearly optimized, by this invention, resulting in a much thinner arm. Use of this arm lowers the vertical profile of disc drives. In drives having a plurality of discs, use of this carriage arm allows much closer placement of the discs, reducing the height of the drive.

BRIEF DESCRIPTION OF THE DRAWINGS

Other objects and advantages of this invention will be understood after referring to the detailed description of the preferred embodiment and to the appended drawings, wherein:

FIG. 2 is a detailed view of the carriage arm, head, and flexure which is used to mount the head on the arm;

FIGS. 3A, 3B and 3C are exploded plan views of the details of head mount and flexure of this invention.

FIG. 1 comprises a plan view of the rigid magnetic disc, its enclosure and the rotary head carrying actuator. The apparatus can be characterized as "Winchester technology" since it employs a sealed, non-removable, lightly loaded head 10 which flies over a lubricated rigid disc 12. The enclosure 15 is provided to maintain a controlled ambient atmosphere for the spinning magnetic disc and magnetic head flying on an air bearing relative to the disc. It should be noted that while a single combination of carriage arm 21 comprising head mount 32 and flexure 20 mounting head 10 is shown in this figure, the mirror image of the combination could be mounted from the same carriage to read the underside of the disc 12 or either side of another disc on a stack of discs.

Figure 1:
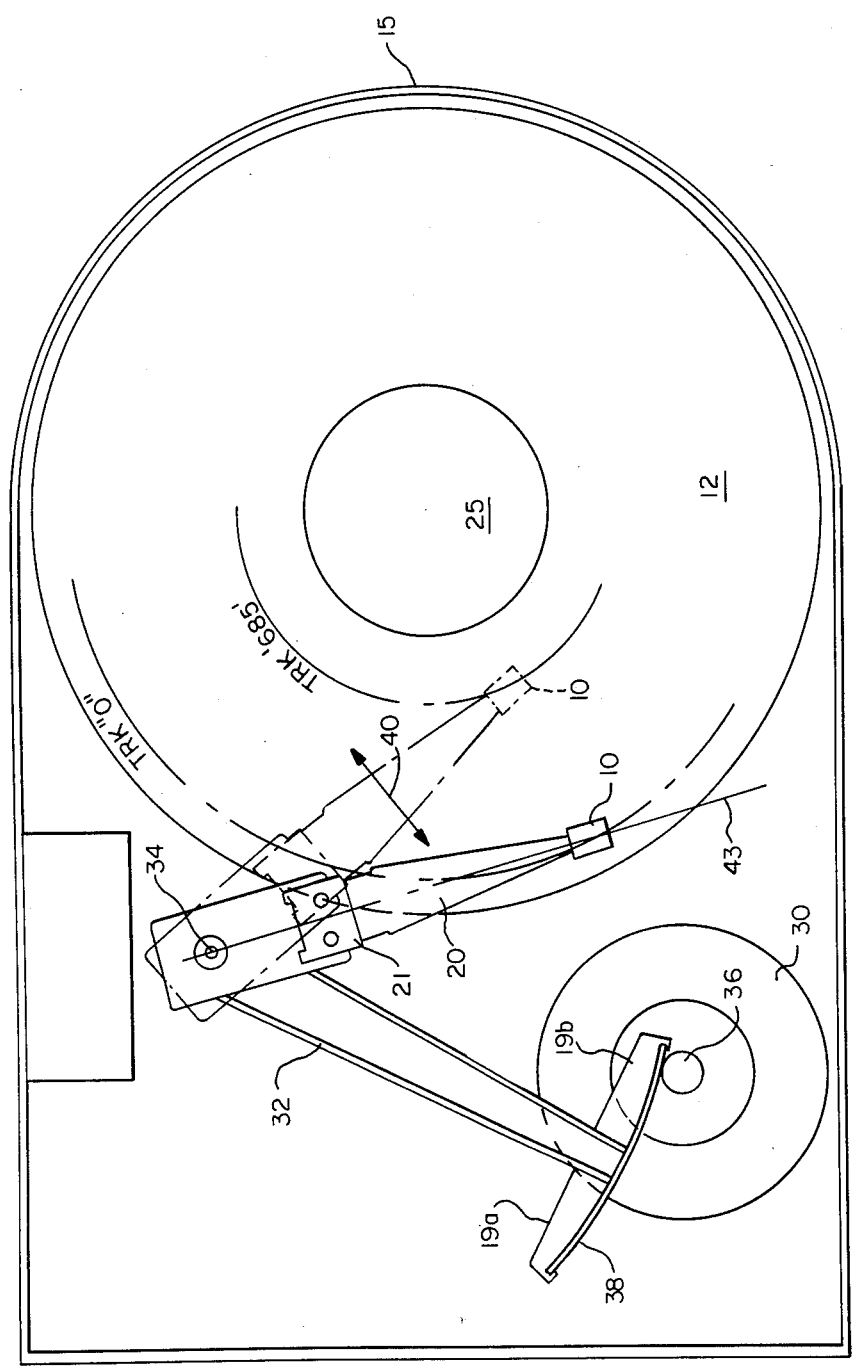
FIG. 1 is a plan view of a magnetic disc apparatus incorporating the rotary actuator of this invention.

The housing 15 provides the required sealing of the ambient atmosphere. A constant speed motor 25 drives the disc 12 which will thus spin about its spin axis; a stepper motor 30 provides step rotational motion to the pivotal drive arm 32 and the carriage arm 21 which are joined together at a common pivot point 34. Details of the drive connection between the stepper motor 30 through its drive shaft 36 and the curved head portion 38 of the drive arm 32 are shown in the incorporated parent application; details of the carriage arm 21, flexure 20 and head 10 are shown in FIG. 2.

Referring again to FIG. 1, the motor shaft 36 is connected to the curved head portion 38 through a helical band that winds and unwinds on the motor shaft 36 to convey the step rotational motion of the motor 30 to the carriage. Details of this combination are disclosed in the application of Steven Kaczeus, et al., Ser. No. 595,894 filed Apr. 2, 1984, entitled Improved Band Drive for Disc Storage Apparatus assigned to the Assignee of this invention, now U.S. Pat. No. 4,614,989 and incorporated herein by reference.

Referring to FIG. 2, details of the carriage arm 21 and flexure 20 which carry the head 10 comprising slider 42 and transducer 44 appear therein.

It is apparent from an inspection of FIG. 1 that any misalignment of flexure 20 in a sidewise direction along the arrow 40 could have serious mistracking effects. A thermal analysis of disc drives incorporating a carriage arm of the type shown in FIG. 1 resulted in the observation that a key problem causing thermal mistracking in such drives was independent motion of the read/write heads apart from the defined movement of the carriage arm 21 and flexure 20. That is, the flexure 20 was moving sideways relative to the central axis 43 which runs from the pivot 34 through the head 10.

Analysis of the flexure 20 and carriage arm 21 led to the conclusion that the movement along arrow 40 can be attributed to the differential expansion of the stainless steel flexure 20 and the magnesium carriage arm 21. In known devices, these two parts were pinned together using screws 44, 46 illustrated in FIG. 2. In essence, this creates a bimetallic strip 23 which causes differential motion along the axis 40 over the operating temperature range of the drive. The direction of the motion was unpredictable because the magnesium arm 21 would pull the flexure one way or another, depending on the clamping force of one rivet 44 or 46 relative to the other.

Therefore, in accordance with this invention, a single solid rivet has now been used in the center of the part. The rivet is passed through the featured hole 50 shown in FIG. 3A, and an oval hole 52 in the flexure 20 shown in FIG. 3B. The use of this single rivet in the center of the part allows the magnesium carriage arm 21 to float on either side of the rivet, alleviating the stress and the resultant motion of the flexure 20.

The problem of using a single rivet such as the rivet 54 illustrated in FIG. 2, was that there was no mechanism to keep the rivet and flexure from rotating about the rivet's axis of rotation. The problem was solved by featuring the hole 50 in the arm 21 (FIG. 3A) modifying the shape of the hole 52 in flexure 20 (FIG. 3B). Specifically, extended key portions 56A, B, C, D are provided along the two major axes of the hole 50 in arm 21 as shown in FIG. 3C. One of the axes of the feature portions is aligned with the central axis 43 of the carriage arm.

The pressure encountered by the rivet during the riveting process is high enough to cause the rivet to cold flow into the featured hole 50 in the arm 21 (FIG. 3A) and the oval hole 52 FIG. 3B) in the flexure. This effectively eliminates relative rotation of the two parts.

This method of staking the flexure 20 to the carriage arm 21 also reduces the cross-sectional thickness of the assembly, allowing closer spacing of the discs in the disc drive.

Modifications of the present invention may become apparent to one skilled in the art who has studied the above invention disclosure. For example, other forms of band drive may be used; the assembly would appear to be usable in linear as well as rotary actuators. Therefore, the scope of the present invention is to be limited only by the appended claims.

What is claimed is:

1. A device for supporting a transducer in operating position over a recording medium, said device comprising
a slider having a transducer affixed thereto;
an arm assembly movable about a pivot, means for holding said slider on said arm assembly, said arm assembly comprising a carriage arm supported at said pivot, and a flexure connected to an end of said carriage arm distal from said pivot and extending to said slider, said carriage arm and flexure being formed of different materials having different rates of thermal expansion to effectively form a bimetallic strip, and means for connecting said carriage arm and said flexure wherein said flexure and said carriage arm each include a single hole, said single holes being superposed at the connection of the flexure and carriage arm and a rivet extending through said holes to maintain said carriage arm and said flexure between opposed head portions of said rivet, one of said holes in said carriage arm or flexure including features in the edges of the hole, said rivet being deformed to fit the features in said hole to prevent relative movement of said arm and said flexure while allowing the carriage arm and flexure to differentially expand to relieve motion of the flexure relative to the recording medium due to the stresses caused by differential thermal expansion of the materials of the carriage arm and flexure.

2. A device as in claim 1 wherein said slider has a major axis extending approximately tangent to the track to be read at the center of the recording medium and through the connection point of said carriage arm and said flexure, the other one of said holes in said arm and said flexure being elongated along said major axis to allow for thermal expansion along said axis and said tangent.

3. A transducer supporting device as in claim 2 wherein said one featured hole in said carriage arm and flexure includes key-like features in the edges of the hole extending along said major axis and perpendicular to said major axis, said rivet being deformed to matingly cooperate with the features in said hole to prevent relative movement of said carriage arm and said flexure.

4. A transducer supporting device as in claim 3 wherein said rivet is pressed into said hole to cold flow into the features in said hole, whereby the height of said arm assembly is minimized.

5. A transducer supporting device as in claim 1 wherein said rivet is pressed into said hole to cold flow into the features in said hole, whereby the height of said arm assembly is minimized.

* * * * *